US011423251B2

(12) United States Patent
Yadav et al.

(10) Patent No.: US 11,423,251 B2
(45) Date of Patent: Aug. 23, 2022

(54) METHOD AND SYSTEM OF PERFORMING CONVOLUTION IN NEURAL NETWORKS WITH VARIABLE DILATION RATE

(71) Applicant: Samsung Electronics Co., Ltd., Suwon-si (KR)

(72) Inventors: Dinesh Kumar Yadav, Bangalore (IN); Ankur Deshwal, Bangalore (IN); Saptarsi Das, Bangalore (IN); Junwoo Jang, Suwon-si (KR); Sehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 16/733,314

(22) Filed: Jan. 3, 2020

(65) Prior Publication Data
US 2020/0218936 A1 Jul. 9, 2020

(30) Foreign Application Priority Data

Jan. 3, 2019 (IN) .............................. 201941000324
Dec. 27, 2019 (IN) ............................. 2019 41000324

(51) Int. Cl.
G06K 9/62 (2022.01)
G06N 3/08 (2006.01)
G06T 1/00 (2006.01)

(52) U.S. Cl.
CPC .............. *G06K 9/6229* (2013.01); *G06N 3/08* (2013.01); *G06T 1/0007* (2013.01)

(58) Field of Classification Search
None
See application file for complete search history.

(56) References Cited

U.S. PATENT DOCUMENTS 9,953,236 B1 4/2018 Huang et al.
10,067,509 B1 9/2018 Wang et al.
(Continued)

FOREIGN PATENT DOCUMENTS

WO  WO-2009142858 A2 * 11/2009 ............. G06K 9/342
WO  WO 2018/081089 A1  5/2018

OTHER PUBLICATIONS

H. Zhu, Y. Qiao, G. Xu, L. Deng and Y.-F. Yu, "DSPNet: A Lightweight Dilated Convolution Neural Networks for Spectral Deconvolution With Self-Paced Learning," in IEEE Transactions on Industrial Informatics, vol. 16, No. 12, pp. 7392-7401, Dec. 2020, doi: 10.1109/TII.2019.2960837 (Year: 2020).*

(Continued)

*Primary Examiner* — Tahmina N Ansari
(74) *Attorney, Agent, or Firm* — NSIP Law

(57) ABSTRACT

A method of performing convolution in a neural network with variable dilation rate is provided. The method includes receiving a size of a first kernel and a dilation rate, determining at least one of size of one or more disintegrated kernels based on the size of the first kernel, a baseline architecture of a memory and the dilation rate, determining an address of one or more blocks of an input image based on the dilation rate, and one or more parameters associated with a size of the input image and the memory. Thereafter, the one or more blocks of the input image and the one or more disintegrated kernels are fetched from the memory, and an output image is obtained based on convolution of each of the one or more disintegrated kernels and the one or more blocks of the input image.

14 Claims, 17 Drawing Sheets

(56) References Cited

U.S. PATENT DOCUMENTS

| | | | |
|---|---|---|---|
| 10,685,286 B1* | 6/2020 | McDonnell | G06N 3/0445 |
| 11,030,724 B2* | 6/2021 | Cho | G06N 20/10 |
| 2011/0029471 A1* | 2/2011 | Chakradhar | G06N 3/063 |
| | | | 706/25 |
| 2018/0032987 A1 | 2/2018 | Morgan et al. | |
| 2018/0218502 A1 | 8/2018 | Golden et al. | |
| 2019/0005603 A1 | 1/2019 | Chen et al. | |
| 2020/0090306 A1* | 3/2020 | Cho | G06T 5/30 |
| 2020/0218936 A1* | 7/2020 | Yadav | G06T 5/20 |
| 2021/0150370 A1* | 5/2021 | McDonnell | G06N 3/04 |

OTHER PUBLICATIONS

D. Im, D. Han, S. Choi, S. Kang and H. Yoo, "DT-CNN: Dilated and Transposed Convolution Neural Network Accelerator for Real-Time Image Segmentation on Mobile Devices," 2019 IEEE International Symposium on Circuits and Systems (ISCAS), 2019, pp. 1-5, doi: 10.1109/ISCAS.2019.8702243. (Year: 2019).*

Dumoulin, et al. "A guide to convolution arithmetic for deep learning." *arXiv preprint arXiv:1603.07285* (2016). (31 pages in English).

Albericio, et al. "Cnvlutin: Ineffectual-neuron-free deep neural network computing." *ACM SIGARCH Computer Architecture News* 44.3 (2016): 1-13. (13 pages in English).

Chen, et al. "Eyeriss: A spatial architecture for energy-efficient dataflow for convolutional neural networks." *ACM SIGARCH Computer Architecture News* 44.3 (2016): 367-379. (13 pages in English).

Kim, et al. "Zena: Zero-aware neural network accelerator." *IEEE Design & Test* 35.1 (2017): 39-46. (8 pages in English).

Li, et al. "Csrnet: Dilated convolutional neural networks for understanding the highly congested scenes." *Proceedings of the IEEE conference on computer vision and pattern recognition.* 2018. (16 pages in English).

Fu, Huan, et al. "Deep ordinal regression network for monocular depth estimation." *Proceedings of the IEEE Conference on Computer Vision and Pattern Recognition.* 2018. (10 pages in English).

Wang, et al. "Understanding convolution for semantic segmentation." *2018 IEEE winter conference on applications of computer vision (WACV).* IEEE, 2018, (10 pages in English).

Chen, et al. "Encoder-decoder with atrous separable convolution for semantic image segmentation." *Proceedings of the European conference on computer vision (ECCV).* Aug. 2018. (18 pages in English).

NVIDIA Deep Learning Accelerator (NVDLA) May 7, 2021 (4 pages in English).

Wang, et al. "Smoothed dilated convolutions for improved dense prediction." *Data Mining and Knowledge Discovery* (2021): 1-27. (10 pages in English).

Yu, Fisher et al., "Multi-Scale Context Aggregation by Dilated Convolutions." *Conference paper at ICLR 2016*, 2016 (pp. 1-13).

Chen, Liang-Chieh et al., "DeepLab: Semantic Image Segmentation with Deep Convolutional Nets, Atrous Convolution, and Fully Connected CRFs." *arXiv:1606.00915v1*, 2016 (pp. 1-14).

Zhang, Mo et al., "ASCNet: Adaptive-Scale Convolutional Neural Networks for Multi-Scale Feature Learning." *arXiv: 1907.03241v1*, 2019 (pp. 1-9).

Extended European Search Report dated May 15, 2020 in corresponding European Patent Application No. 20150187.1 (8 pages in English).

\* cited by examiner

|   |   |   |   |   |   |
|---|---|---|---|---|---|
| 3 | 0 | 1 | 2 | 7 | 4 |
| 1 | 5 | 8 | 9 | 3 | 1 |
| 2 | 7 | 2 | 5 | 1 | 3 |
| 0 | 1 | 3 | 1 | 7 | 8 |
| 4 | 2 | 1 | 6 | 2 | 8 |
| 2 | 4 | 5 | 2 | 3 | 9 |

101

*

| 1 | 0 | -1 |
|---|---|----|
| 1 | 0 | -1 |
| 1 | 0 | -1 |

102

=

| -5 | 0  |
|----|----|
| 0  | -4 |

103

104

105

104

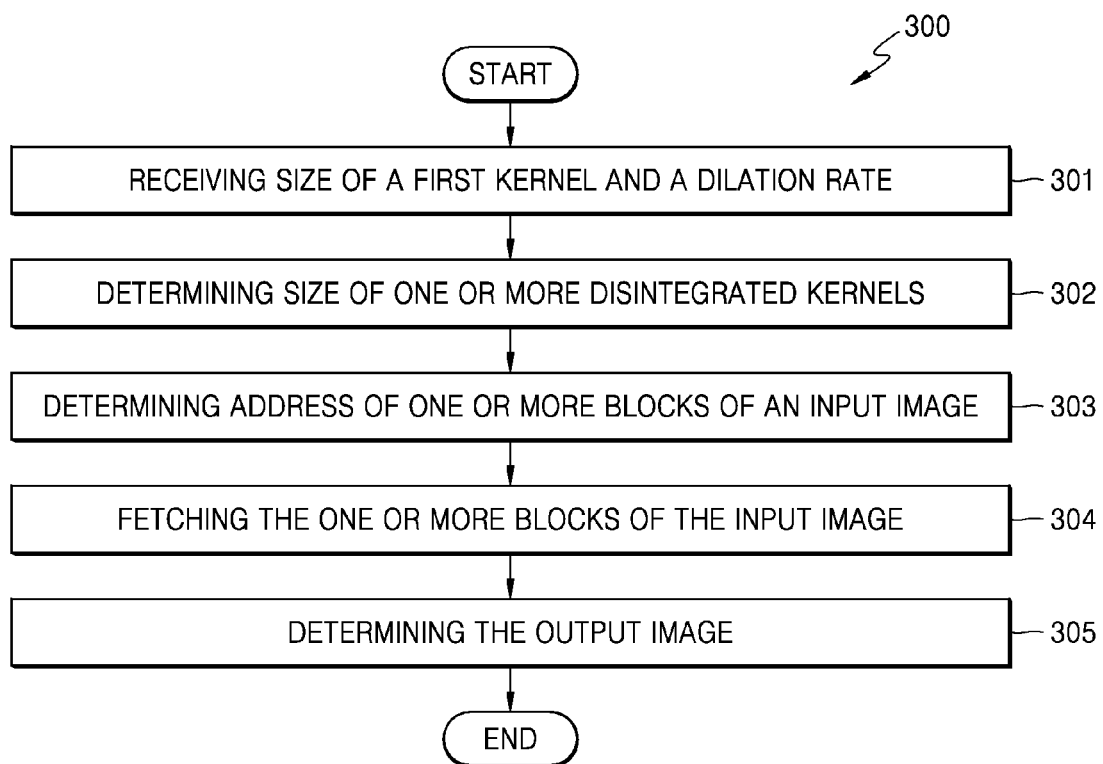

| Dilation Rate | | Size of one or more Disintegrated Kernels |
|---|---|---|
| 8*n+0 | 8,16,24,32,⋯ | 1x1 kernel |
| 8*n+1 | 9,17,25,33,⋯ | 3x3 kernel |
| 8*n+2 | 10,18,26,34,⋯ | 3x5 kernel |
| 8*n+3 | 11,19,27,35,⋯ | 4x7 kernel |
| 8*n+4 | 12,20,28,36,⋯ | 1x5 kernel |
| 8*n+5 | 13,21,29,37,⋯ | 3x6 kernel |
| 8*n+6 | 14,22,30,38,⋯ | 3x7 kernel |
| 8*n+7 | 15,23,31,39,⋯ | 4x8 kernel |

Column Stride=1
Row Stride=3
Channel Stride=3*5=15
Dilation Column Stride=1*1=1
Dilation Row stride=3*2=6
Base Address=0

| Counters | Max value |
|---|---|
| Cell Number X | 1 |
| Cell Number Y | 1 |
| Cell Number Z | — |
| Dilation Offset X | 3 |
| Dilation Offset Y | 3 |

| Read Cycles | 0th | 1st | 2nd | 3rd | 4th | 5th | 6th | 7th | 8th |
|---|---|---|---|---|---|---|---|---|---|
| Cell Number X | 0 | 0 | 0 | 0 | 0 | 0 | 0 | 0 | 0 |
| Cell Number Y | 0 | 0 | 0 | 0 | 0 | 0 | 0 | 0 | 0 |
| Cell Number Z | 0 | 0 | 0 | 0 | 0 | 0 | 0 | 0 | 0 |
| Dilaton Offset X | 0 | 1 | 2 | 0 | 1 | 2 | 0 | 1 | 2 |
| Dilaton Offset Y | 0 | 0 | 0 | 1 | 1 | 1 | 2 | 2 | 2 |
| Generated Address | 0 | 1 | 2 | 6 | 7 | 8 | 12 | 13 | 14 |

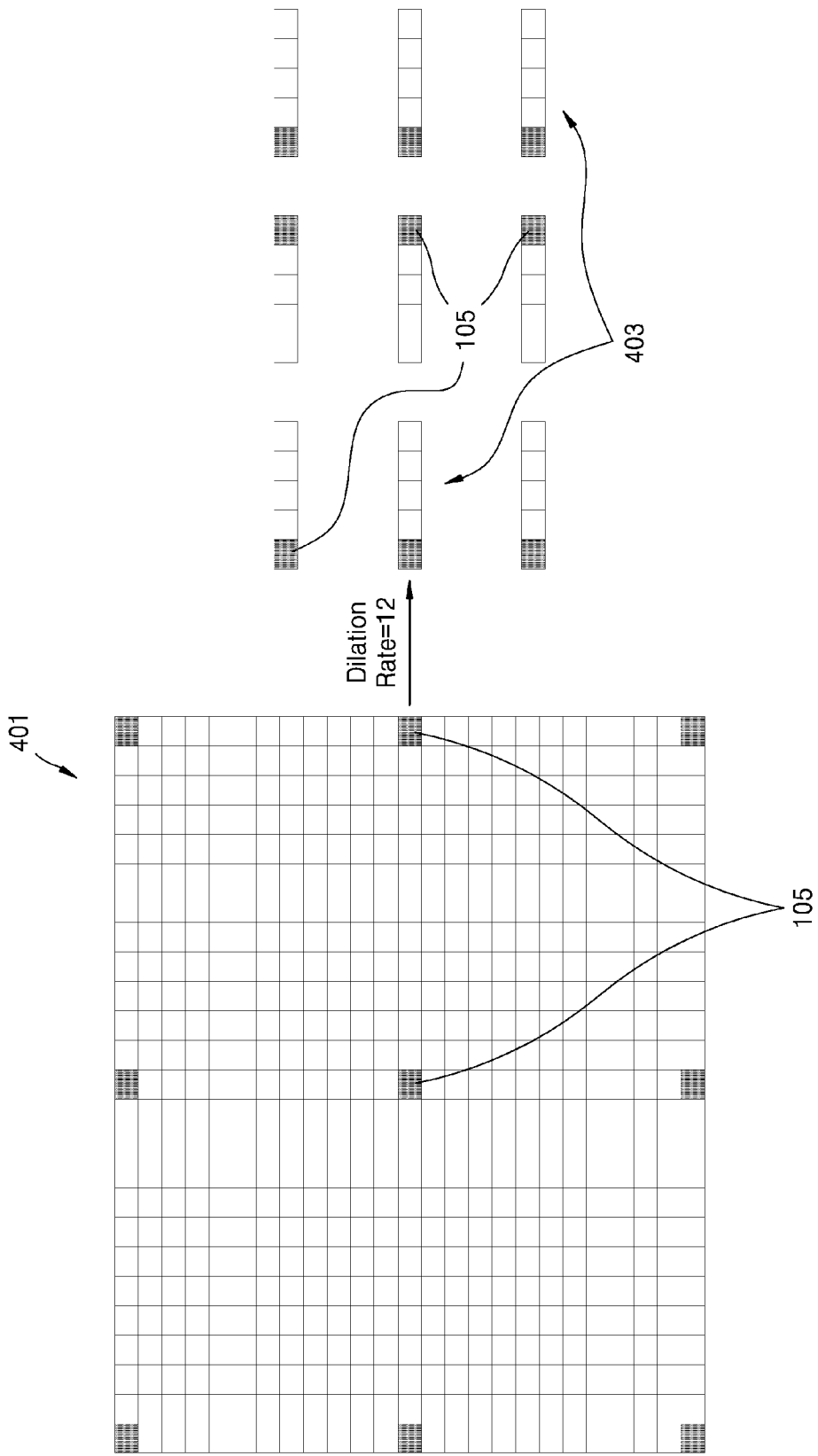

METHOD AND SYSTEM OF PERFORMING CONVOLUTION IN NEURAL NETWORKS WITH VARIABLE DILATION RATE

CROSS-REFERENCE TO RELATED APPLICATIONS

This application claims the benefit under 35 USC § 119(a) of Indian Provisional Application No. 201941000324 filed on Jan. 3, 2019, and Indian Patent Application No. 201941000324 filed on Dec. 27, 2019, the entire disclosures of which are incorporated herein by reference for all purposes.

BACKGROUND

1. Field

The following description relates to a method and system of performing convolution in neural networks with variable dilation rate.

2. Description of Related Art

Typically, a dilated convolution technique is used in deep learning neural networks to perform scene segmentation and molecular depth estimation in input images or in input videos.

The dilated convolution technique provides accurate results when compared to an un-dilated convolution technique. A convolution technique involves computing a dot product between the one or more values of a kernel with one or more values of the input image. The dot product is computed across the width and height of the input image. In the example of dilated convolution, the one or more values of a dilated kernel may be obtained by inserting zeros between the one or more values of the kernel in a x-direction and a y-direction. The number of zeros inserted to obtain the dilated kernel is based on a dilation rate. The convolution of the dilated kernel with the input image includes multiplication of the one or more values of the input image with the inserted zeros in the dilated kernel. Therefore, eliminating the multiplication of the one or more values of the input image with the inserted zeros in the dilated kernel reduces the time required to compute an output of the convolution, and results in faster processing of the input image or the input video.

An existing technique disintegrates the dilated kernel into a plurality of small kernels, and adds the output of convolution of the input image with each of the plurality of small kernels. A disadvantage with the existing technique is that the size of the plurality of small kernels is the same, regardless of the dilation rate. Another disadvantage with the existing technique is that a count of the plurality of small kernels increases with an increase in the dilation rate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a process-implemented convolution method comprises receiving, by a computing system, a size of a first kernel and a dilation rate; determining, by the computing system, at least one of a size of one or more disintegrated kernels based on the size of the first kernel, a baseline architecture of a memory associated with the computing system, and the dilation rate; determining, by the computing system, an address of one or more blocks of an input image corresponding to each of the one or more disintegrated kernels based on the dilation rate and one or more parameters associated with a size of the input image and the memory; fetching, by the computing system, the one or more blocks of the input image based on the address, and the one or more disintegrated kernels from the memory; and determining, by the computing system, an output image based on convolution of each of the one or more disintegrated kernels and the one or more blocks of the input image.

The address of the one or more blocks may be determined based on the one or more parameters, wherein the one or more parameters comprise at least one of a Base Address of a first block among the one or more blocks in the memory, a Column Stride, a Cell Number X, a Row Stride, a Cell Number Y, a Channel Stride, a Cell Number Z, a Dilation Column Stride, a Dilation Offset X, a Dilation Row Stride, and a Dilation Offset Y, wherein X is indicative of a number of blocks in a horizontal direction of the image, Y is indicative of a number of blocks in a vertical direction of the image, Z is indicative of a number of blocks per channel in the image.

A size of the one or more blocks of the input image stored in the memory may be based on the baseline architecture of the memory.

The one or more blocks of the input image stored in the memory may be based on at least one of the baseline architecture of the memory and the dilation rate.

The fetching of the one or more blocks of the input image may include fetching a plurality of pixel values of the input image corresponding to each block of the one or more blocks of the input image.

The fetching of the one or more disintegrated kernels from the memory may include identifying one or more kernel values corresponding to the one or more disintegrated kernels in a second kernel, wherein the second kernel is generated based on the first kernel and the dilation rate; and fetching the one or more kernel values corresponding to the one or more disintegrated kernels based on the size of the one or more disintegrated kernels.

The determining of the output image may include generating one or more matrices by multiplying one or more kernel values of each of the one or more disintegrated kernels with a plurality of pixel values corresponding to each block of the one or more blocks of the input image; and adding the one or more matrices to determine the output image.

In a general aspect, a computing system includes a processor; and a memory communicatively coupled to the processor, wherein the memory stores the processor instructions, which, on execution, causes the processor to: receive a size of a first kernel and a dilation rate; determine at least one of a size of one or more disintegrated kernels based on the size of the first kernel, a baseline architecture of the memory associated with the computing system, and the dilation rate; determine an address of one or more blocks of an input image corresponding to each of the one or more disintegrated kernels based on the dilation rate, and one or more parameters associated with a size of the input image and the memory; fetch the one or more blocks of the input image based on the address, and the one or more disintegrated kernels from the memory; and determine an output image based on convolution of each of the one or more disintegrated kernels and the one or more blocks of the input image.

The processor may be configured to determine the address of the one or more blocks based on the one or more parameters, wherein the one or more parameters comprise at least one of a Base Address of a first block among the one or more blocks in the memory, a Column Stride, a Cell Number X, a Row Stride, a Cell Number Y, a Channel Stride, Cell Number Z, a Dilation Column Stride, a Dilation Offset X, a Dilation Row Stride, and a Dilation Offset Y, wherein X is indicative of a number of blocks in a horizontal direction of the image, Y is indicative of a number of blocks in a vertical direction of the image, Z is indicative of a number of blocks per channel in the image.

The processor may be configured to determine a size of the one or more blocks of the input image stored in the memory based on the baseline architecture of the memory.

The processor may be configured to store the one or more blocks of the input image in the memory based on at least one of the baseline architecture of the memory and the dilation rate.

The fetching of the one or more blocks of the input image by the processor may include fetching a plurality of pixel values of the input image corresponding to each block of the one or more blocks of the input image.

The fetching of the one or more disintegrated kernels from the memory by the processor may include identifying one or more kernel values corresponding to the one or more disintegrated kernels in a second kernel, wherein the second kernel is generated based on the first kernel and the dilation rate; and fetching the one or more kernel values corresponding to the one or more disintegrated kernels based on the size of the one or more disintegrated kernels.

The determining of the output image by the processor may include generating one or more matrices by multiplying one or more kernel values of each of the one or more disintegrated kernels with a plurality of pixel values corresponding to each block of the one or more blocks of the input image; and adding the one or more matrices to determine the output image.

In a general aspect, a processor-implemented convolution method includes receiving, by a processor, an input image including a plurality of pixel values, receiving a size of first kernel and a dilation rate, dividing the first kernel into one or more disintegrated kernels, generating one or more matrices by multiplying one or more kernel values of the one or more disintegrated kernels with pixel values corresponding to each block of one or more blocks of the input image, adding the one or more matrices; and determining, by the processor, an output image based on the added matrices.

The one or more blocks of the input image may be based on at least one of a baseline architecture of a memory and the dilation rate.

A size of the one or more disintegrated kernels may be determined based on at least one of a size of the first kernel, the baseline architecture of the memory, and the dilation rate.

Other features and aspects will be apparent from the following detailed description, the drawings, and the claims.

BRIEF DESCRIPTION OF DRAWINGS

Figure 1A:
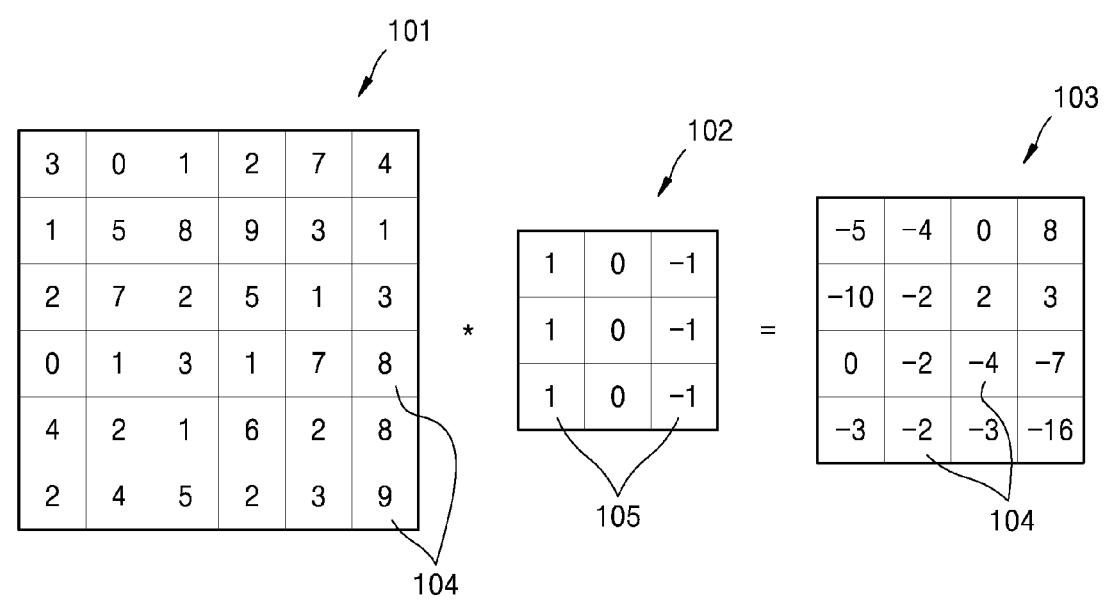

FIG. 1A illustrates an example of the convolution of an input image with a first kernel to generate an output image, in accordance with one or more exemplary embodiments;

FIG. 1B illustrates an example of a computation of a dot product between the plurality of pixel values of an input image with one or more kernel values of a first kernel to generate the plurality of pixel values of an output image, in accordance with one or more exemplary embodiments;

FIG. 1C illustrates an example of a convolution of an input image with a first kernel to generate the output image with a stride of "2", in accordance with one or more exemplary embodiments;

FIG. 3 illustrates a flowchart of convolution operations in a neural network with variable dilation rate, in accordance with one or more exemplary embodiments;

FIG. 4G illustrates an example of determining one or more disintegrated kernels for a dilation rate of 12, in accordance with one or more exemplary embodiments;

Figure 1D:
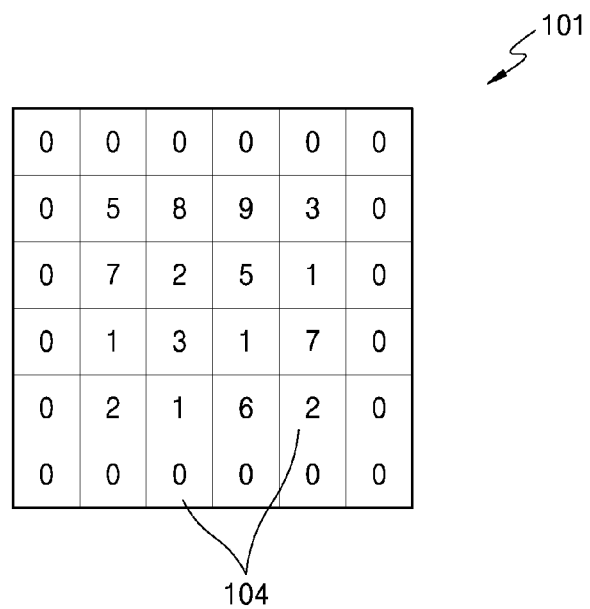
FIG. 1D illustrates an example input image padded with zeros, in accordance with one or more exemplary embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical and scientific terms used herein have the same meaning as commonly understood by one of ordinary skill in the art to which this disclosure pertains after an understanding of the present disclosure. It will be further understood that terms, such as those defined in commonly-used dictionaries, should be interpreted as having a meaning that is consistent with their meaning in the context of the relevant art and the present disclosure, and are not to be interpreted in an idealized or overly formal sense unless expressly so defined herein.

When describing the examples with reference to the accompanying drawings, like reference numerals refer to like constituent elements and a repeated description related thereto will be omitted. In the description of examples, a detailed description of well-known related structures or functions will be omitted when it is deemed that such description will cause ambiguous interpretation of the present disclosure.

The description relates to a method of convolution in neural networks with variable dilation rate.

Convolution is an operation that is performed on an input image to extract features for performing one or more image processing tasks, for example, object recognition, scene segmentation and similar tasks. The convolution operation involves computing a dot product between the one or more kernel values with a plurality of pixel values of the input image. Additionally, the dot product is computed across a width and a height of the input image.

For example, referring to FIG. 1A, consider the input image (101) which includes a plurality of pixel values (104) and a first kernel (102) with one or more kernel values (105) as shown in FIG. 1A. The input image (101) is represented as a matrix with 6 rows and 6 columns. The first kernel (102) is represented as the matrix with 3 rows and 3 columns. An output image (103) obtained as a result of convolving the input image (101) with the first kernel (102) with a stride of "1" is shown in FIG. 1A. A value corresponding to the first row and first column in the output image 103 (i.e. −5) and a value corresponding to the first row and second column in the output image 103 (i.e. −4) obtained by convolving the input image (101) with the first kernel (102) is as shown in FIG. 1B. Further, the number of rows and the number of columns of the output image (103) may be computed using Equations 1 and 2 below:

$$\text{number of rows} = \frac{\text{number of rows of the input image (101)} - \text{number of rows of the first kernel (102)} + 1}{\text{stride}} \quad \text{Equation 1}$$

$$\text{number of columns} = \frac{\text{number of columns of the input image (101)} - \text{number of columns of the first kernel (102)} + 1}{\text{stride}} \quad \text{Equation 2}$$

In Equations 1 and 2, the stride is indicative of the number of pixels to be skipped in computing the dot product across the width and the height of the input image (101). For example, a stride of 2 indicates a shift by 2 rows or 2 columns while computing the dot product across the width and the height of the input image (101). An increase in the value of the stride decreases the size of the output image (103) due to decrease in the number of dot products computed across the width and the height of the input image (101).

For example, the result of convolving the input image (101) with the first kernel (102) with a stride of "2" is shown in FIG. 10. In an example, the input image (101) may be padded with one or more rows of zeros and one or more columns of zeros when the number of rows and the number of columns of the output image (103) should be equal to the number of rows and number of columns of the input image (101). For example, the input image (101) padded with two rows and two columns of zeros is as shown in FIG. 1D.

Figure 2A:
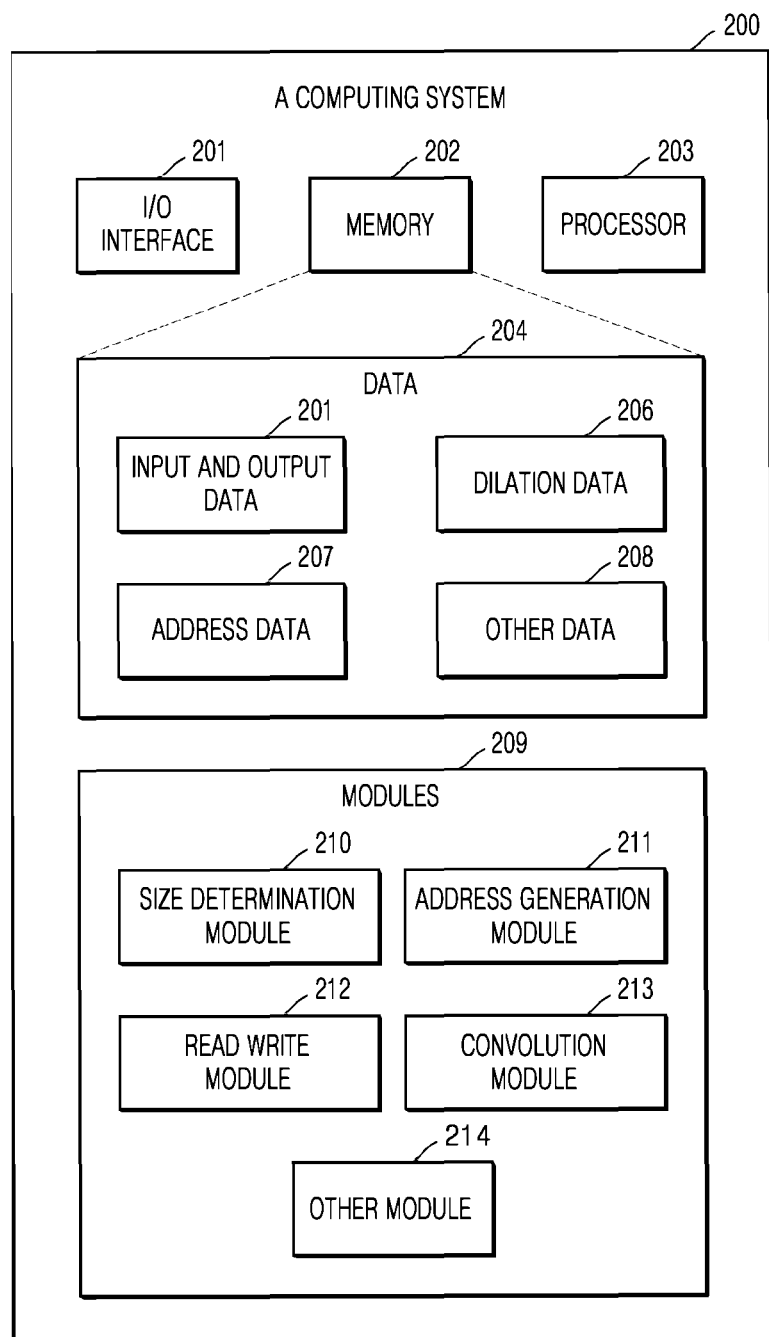
FIG. 2A illustrates a detailed block diagram of a computing system, in accordance with one or more exemplary embodiments.

FIG. 2A illustrates a detailed block diagram of a computing system (200), in accordance with one or more embodiments.

Referring to FIG. 2A, the computing system (200) may include a Central Processing Unit ("CPU" or "processor") (203) and a memory (202) configured to store instructions that are executable by the processor (203). The processor (203) may include at least one data processor that is configured to execute program components for executing user or system-generated requests. The memory (202) may be communicatively coupled to the processor 203. The computing system (200) further includes an Input/Output (I/O) interface (201). The I/O interface (201) may be coupled with the processor (203) through which an input signal or/and an output signal may be communicated. In an example, the computing system (200) may receive the input image (101), the first kernel (102), and a dilation rate through the I/O interface (201).

In one or more examples, the computing system (200) may include data (204) and modules (209) as shown in FIG. 2A. In an example, the data (204) and modules (209) may be stored in the memory (202) configured in the computing system (200). In an example, the data (204) may include, for example, input and output data (205), dilation data (206), address data (207) and other data (208). In the illustrated FIG. 2A, data (204) are described herein in detail.

In an example, the input and output data (205) includes at least one of the plurality of pixel values (104) of the input image (101), one or more kernel values (105) associated with the first kernel (102), and the plurality of pixel values (104) of the output image (103). Further, the input and output data (205) may include at least one of a size of the input image (101), a size of the output image (103), and a size of the first kernel (102). The respective sizes are indicative of the number of rows and the number of columns present in the matrix of the input image (101), first kernel (102) and the output image (103). For example, the plurality of pixel values (104) of the input image (101) having a size of 6×6, the one or more kernel values (105) associated with the first kernel (102) having a size of 3×3, and the plurality of pixel values (104) of the output image (103) having a size of 4×4 is as shown in FIG. 1A.

In an example, the dilation data (206) may include at least one of a dilation rate, one or more kernel values (105) associated with the second kernel (as discussed below with regard to FIG. 4A), and a size of the second kernel. The size is indicative of the number of rows and the number of columns present in the matrix of the second kernel. The dilation rate is indicative of the one or more zeros to be inserted between the one or more kernel values (105) of the first kernel (102) to generate the second kernel. The one or more zeros may be inserted in the x-direction and in the y-direction of the first kernel (102). For example, a dilation rate of "3" indicates two zeros to be inserted between the one or more kernel values (105) in the x-direction and in the y-direction of the first kernel (102). The one or more zeros inserted between the one or more kernel values (105) may be equal to one less than the dilation rate.

In an example, the address data (207) includes at least one of an address of the one or more blocks of the input image (101), the address of the kernel values (105) associated with the first kernel (102), and the address of the kernel values (105) associated with the second kernel. One or more pixel values (104) among the plurality of pixel values (104) of the input image (101) may be grouped to form the one or more blocks.

Figure 2B:
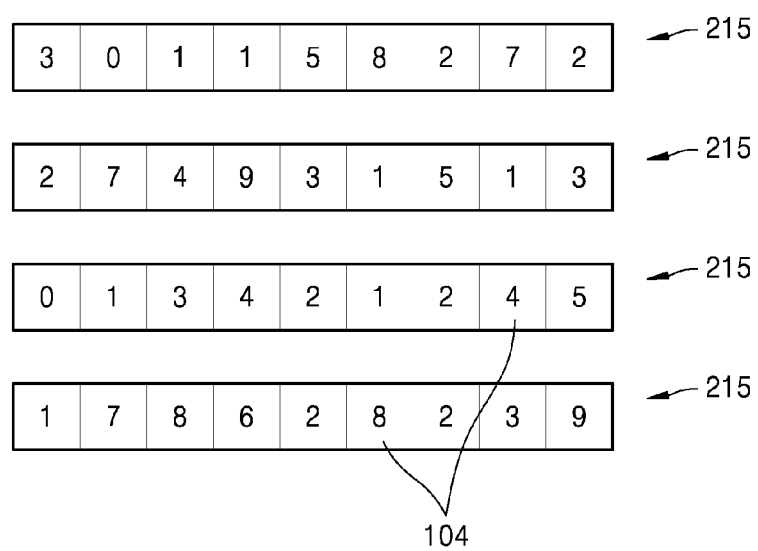
FIG. 2B illustrates an example input image grouped into one or more blocks, in accordance with one or more exemplary embodiments.

For example, as illustrated in FIG. 2B, the one or more pixel values (104) among the plurality of pixel values (104) in the input image (101) shown in FIG. 1A, is grouped into one or more blocks (215) (i.e. 4 blocks (215)) of input image (101) as shown in. Additionally, the address of the one or more blocks (215) is represented using at least one of binary numbers, hexadecimal numbers and the like. For example, the address of a first block of the input image (101) in binary is represented as "0100110110" and the address of a first block of the input image (101) in hexadecimal is represented as "1D295F".

Referring again to FIG. 2A, in an example, the other data (208) may include at least one of a size of the baseline architecture of the memory (202), address of one or more disintegrated kernels, a maximum value associated with counters for example Cell Number X, Cell Number Y, Cell Number Z, Dilation Offset X, and Dilation Offset Y and the like.

In some examples, the data (204) may be stored in the memory (202) in form of various data structures. Additionally, the data (204) may be organized using data models, such as relational or hierarchical data models. The other data (208) may store data, including temporary data and temporary files, generated by the modules (209) for performing the various functions of the computing system (200). Further, in another example, the memory (202) may include at least one of a Static Random-Access Memory (SRAM), Dynamic Random-Access Memory (DRAM), a global buffer and the like.

In some examples, the data (204) stored in the memory (202) may be processed by the modules (209) of the computing system (200). The modules (209) may be stored within the memory (202), communicatively coupled to the processor (203), and may be present outside the memory (202) as shown in FIG. 2A. As used herein, the term modules (209) may refer to an Application Specific Integrated Circuit (ASIC), a Field Programmable Gate Array (FPGA), an electronic circuit, a processor (203) (shared, dedicated, or group) and the memory (202) that execute one or more software or firmware programs, a combinational logic circuit, and/or other suitable components that provide the described functionality. In some other examples, the modules (209) may be implemented using at least one of ASICs and FPGAs.

In one implementation, the modules (209) may include, for example, a size determination module (210), an address generation module (211), a read write module (212), a convolution module (213), and an other module (214). It may be appreciated that such aforementioned modules (209) may be represented as a single module or a combination of different modules, according to examples.

In an example, the size determination module (210) is used to determine the size of one or more disintegrated kernels. The size of the one or more disintegrated kernels is based on at least one of the size of the first kernel (102), a baseline architecture of the memory (202) associated with the computing system (200) and the dilation rate. The baseline architecture of the memory (202) may be indicative of a count of the plurality of pixel values (104) stored in each of the one or more blocks (215) of the memory (202). The plurality of pixel values (104) associated with a first block among the one or more blocks (215) may be read from the memory (202) in one read cycle. The plurality of pixel values (104) is associated with one or more rows and one or more columns of the input image (101). For example, for the one or more blocks (215) shown in FIG. 2B, the baseline architecture is 3×3. A read operation associated with first block of FIG. 2B retrieves a group of 9-pixel values (104) associated with first three rows and first three columns of the input image (101) shown in FIG. 1A. In another example, for a baseline architecture of 8×4, with the size of the first kernel (102) as 3×3 and the dilation rate of 6, the size of the one or more disintegrated kernels is 3×7.

In an example, the address generation module (211) is used to generate the address of one or more blocks (215) of an input image (101). The address of the one or more blocks (215) is determined using one or more parameters comprising at least one of Base Address of a first block among the one or more blocks (215) in the memory (202), Column Stride, Cell Number X, Row Stride, Cell Number Y, Channel Stride, Cell Number Z, Dilation Column Stride, Dilation Offset X, Dilation Row Stride, Dilation Offset Y, wherein X is indicative of number of blocks (215) in a horizontal direction of the input image (101), Y is indicative of number of blocks (215) in a vertical direction of the input image (101), Z is indicative of number of blocks (215) per channel in the input image (101). The address of the one or more blocks (215) is generated using Equations 3-8 below:

$$\text{Row stride} = \frac{\text{number of columns of the input image (101)} + \left(\text{number of columns in the baseline architecture of the memory (202)} - 1\right)}{\left(\text{number of columns in the baseline architecture of the memory (202)}\right)} \quad \text{Equation 3}$$

$$\text{Column Stride} = 1 \quad \text{Equation 4}$$

$$\text{Channel Stride} = \\ \text{Row Stride} * \frac{\text{number of rows of the input image (101)} * \left(\text{number of rows in the baseline architecture of the memory (202)} - 1\right)}{\left(\text{number of rows in the baseline architecture of the memory (202)}\right)} \quad \text{Equation 5}$$

$$\text{Dilation Column Stride} = \\ \text{Column Stride} * \frac{\text{dilation rate}}{\left(\text{number of columns in the baseline architecture of the memory (202)}\right)} \quad \text{Equation 6}$$

$$\text{Dilation Row Stride} = \\ \text{Row Stride} * \frac{\text{dilation rate}}{\left(\text{number of rows in the baseline architecture of the memory (202)}\right)} \quad \text{Equation 7}$$

$$\begin{aligned}\text{address of the one or more blocks} = \\ \text{Base Address} + \text{Column Stride} * \text{Cell Number } X + \\ \text{Row Stride} * \text{Cell Number } Y + \\ \text{Channel Stride} * \text{Cell Number } Z + \\ \text{Column Stride} * \text{Dilation Column Stride} * \text{Dilation} \\ \text{Offset } X + \text{Dilation Row Stride} * \text{DilationOffset\_Y}\end{aligned} \quad \text{Equation 8}$$

The Base Address is indicative of an address of a pixel value in a first row and a first column of the input image (101), the Cell Number X, Cell Number Y, Cell Number Z, Dilation Offset X, and Dilation Offset Y are counters.

In an example, the read write module (212) is used to fetch the one or more blocks (215) of the input image (101) from the memory (202) based on the address of the one or more blocks (215) generated by the address generation module (211). The one or more blocks (215) of the input image (101) fetched by the read write module (212) includes fetching a plurality of pixel values (104) of the input image (101) corresponding to each block of the one or more blocks (215) of the input image (101). Further, the read write module (212) is used to fetch the one or more disintegrated kernels from the memory (202). Furthermore, the read write module (212) is used to write one or more pixel values (104) of the output image (103) to the memory (202).

In an example, the convolution module (213) is used to perform the convolution operation between the one or more blocks (215) of the input image (101) and each of the one or more disintegrated kernels to determine the output image (103). The convolution module (213) is used for determining the output image (103), by generating one or more matrices by multiplying one or more kernel values (105) of each of the one or more disintegrated kernels with a plurality of pixel values (104) corresponding to each block of the one or more blocks (215) of the input image (101). Further, the output image (103) is determined by adding the one or more matrices.

In an example, the other module (214) is used to determine a second kernel based on the first kernel (102) and the dilation rate, determine the address of the one or more disintegrated kernels, determine at least one of a column stride, row stride, and channel stride, determine values associated with Cell Number X, Cell Number Y, Cell Number Z, Dilation Offset X, Dilation Offset Y and the like.

FIG. 3 illustrates a flowchart illustrating method of convolution in a neural network with variable dilation rate, in accordance with one or more embodiments. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 5 below, the descriptions of FIGS. 1A-1D and FIGS. 2A and 2B are also applicable to FIG. 3, and are incorporated herein by reference. Thus, the above description may not be repeated here.

Referring to FIG. 3, in operation 301, the computing system (200), receives the size of the first kernel (102), and the dilation rate. For example, the size of the first kernel (102) is "3×3" and the dilation rate is "8".

Figure 4A:
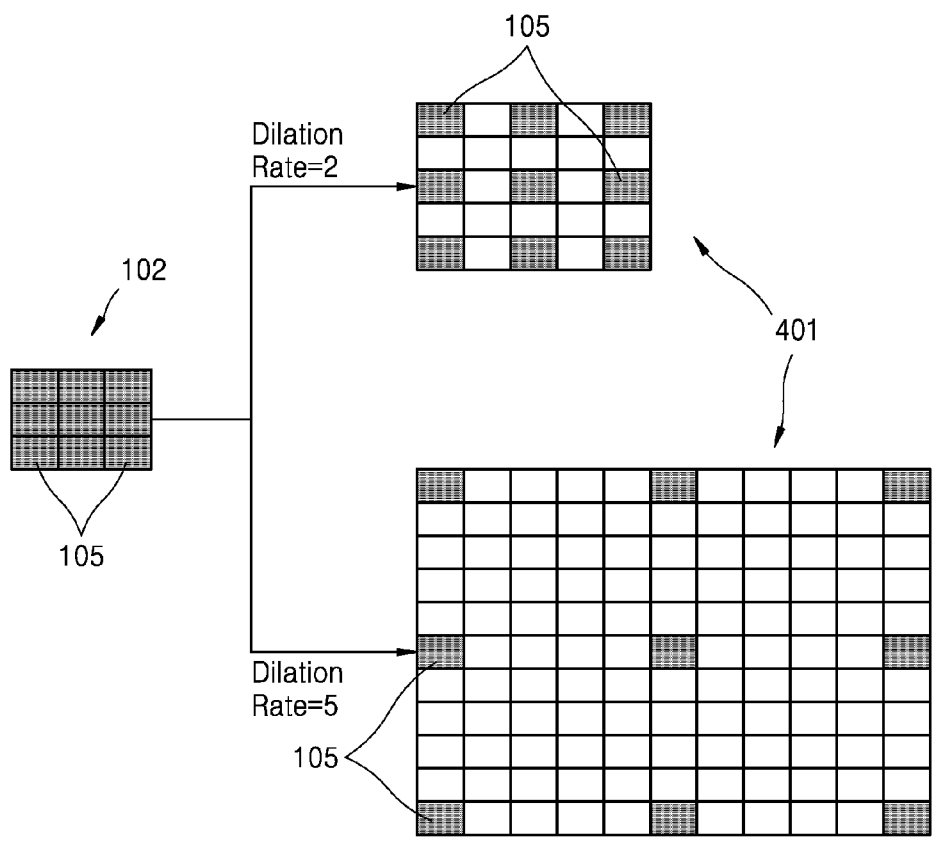
FIG. 4A illustrates an example of generating a second kernel from a first kernel for one or more dilation rates, in accordance with one or more exemplary embodiments.

In an example, the first kernel (102) is indicative of an un-dilated kernel. The un-dilated kernel includes one or more rows and one or more columns of one or more kernel values (105). The size of the first kernel (102) may be 2×2, 3×3, 4×4, and the like. Further, the dilation rate is indicative of the one or more zeros to be inserted between the one or more kernel values (105) of the first kernel (102) to generate the second kernel. The one or more zeros are inserted in the x-direction and in the y-direction of the first kernel (102). The one or more zeros inserted between the one or more kernel values (105) is equal to one less than the dilation rate. For example, consider the first kernel (102) having a size of 3×3 and the one or more kernel values (105) of the first kernel (102) is indicated by a "grey shading" as shown in FIG. 4A. The first kernel (102) is dilated with the dilation rate of "2" to generate the second kernel (401) having the size 5×5 as shown in FIG. 4A. The inserted one or more zeros is indicated by "white shading/no shading" as shown in FIG. 4A. In another example, the first kernel (102) is dilated with the dilation rate of "5" to generate the second kernel (401) having the size 11×11 as shown in FIG. 4A. The "grey shading" in the second kernel (401) indicates the one or more kernel values (105) of the first kernel (102) and "white shading" indicates the one or more zeros inserted between the one or more kernel values (105).

Referring back to FIG. 3, at the operation 302, the computing system (200), determines at least one of the size of one or more disintegrated kernels based on at least one of the size of the first kernel (102), the baseline architecture of the memory (202) associated with the computing system (200) and the dilation rate.

Figure 4B:
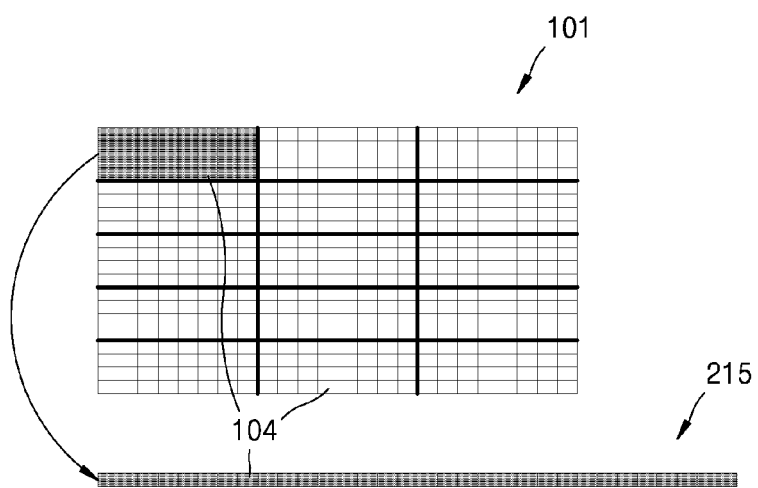
FIGS. 4B and 4C illustrate an example of storing an input image in the memory, in accordance with one or more exemplary embodiments.

In an example, the baseline architecture of the memory (202) is indicative of the count of the plurality of the pixel values (104) read from the memory (202) in one read cycle. Further, the size of the one or more blocks (215) of the input image (101) stored in the memory (202) is based on the baseline architecture of the memory (202). For example, if the baseline architecture is 4×8, then for every read cycle, 32-pixel values (104) are read from the memory (202). The 32-pixel values (104) are stored in one row or one column in the memory (202). Further, the 32-pixel values (104) corresponds to the plurality of pixel values (104) in the input image (101). The 32-pixel values (104) in the input image (101) corresponds to 4 rows and 8 columns. For example, with regard to the input image (101) with the size 20×24 is as shown in FIG. 4B, the plurality of the pixel values (104) are grouped into 15 blocks (215) of size 4×8, where each block includes 32 pixel values (104) as shown in FIG. 4B. The 32-pixel values (104) corresponding to each block is stored in one row of the memory (202) as shown in FIG. 4B. The computing system (200) reads 32-pixel values (104) stored in one row of the memory (202) in one read cycle.

Figure 4C:
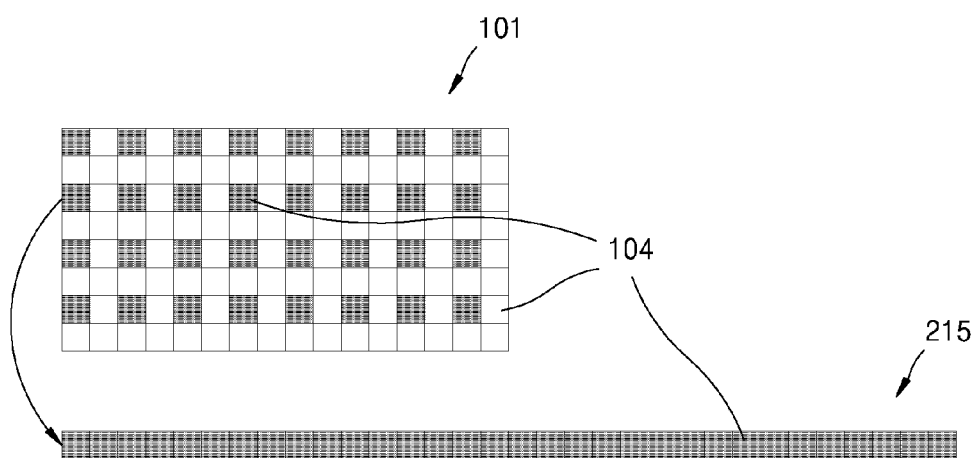

In an example, the one or more blocks (215) of the input image (101) stored in the memory (202) is based on at least one of a baseline architecture of the memory (202) and the dilation rate. For example, consider the baseline architecture of the memory (202) as 4×8 and the dilation rate of 6. The plurality of pixel values (104) in the input image (101) is divided into shards as shown in FIG. 4C. Each shard containing 32-pixel values (104) is stored as one row or one column in the memory (202) as shown in FIG. 4C.

Figure 4D:
FIG. 4D illustrates an example of a determination of size of one or more disintegrated kernels based on dilation rate, in accordance with one or more exemplary embodiments.

In an example, for the baseline architecture of 4×8, the size of the one or more disintegrated kernels corresponding to the second kernel (401) with a variable dilation rate is shown in table (402) of FIG. 4D. The "n" as indicated in table (402) of FIG. 4D is a natural number. The value of "n" is selected to obtain the received dilation rate. Based on the value of "n" and the dilation rate, the corresponding size of the one or more disintegrated kernels is determined from the table (402) as shown in FIG. 4D. For example, if the dilation rate is 14, the value of "n" is selected as "1" and the size of the one or more disintegrated kernels is 3×7. In another example, for dilation rates of 10, 18, 26, 34 and the like, the size of the one or more disintegrated kernels is 3×5. The table (402) as illustrated in FIG. 4D may be determined for one or more baseline architecture of the memory (202), and for one or more dilation rates.

Referring back to FIG. 3, at operation 303, the computing system (200) determines the address of the one or more blocks (215) of the input image (101) corresponding to each of the one or more disintegrated kernels based on the dilation rate, and the one or more parameters associated with a size of the input image (101) and the memory (202).

Figure 4E:
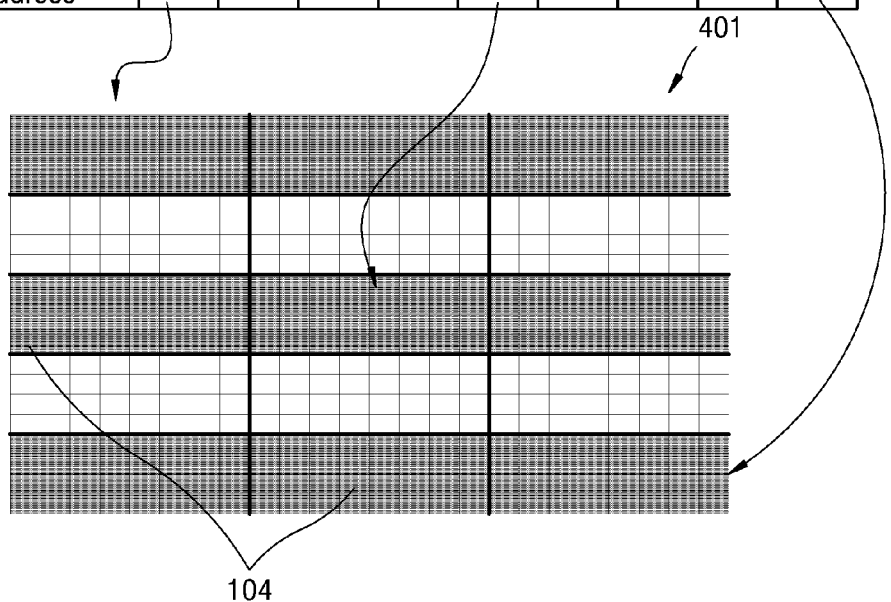
FIG. 4E illustrates an example of a generation of addresses for one or more blocks of the input image, in accordance with one or more exemplary embodiments.

In an example, the address of one or more blocks (215) is determined using the one or more parameters comprising at least one of a Base Address of a first block among the one or more blocks (215) in the memory (202), Column Stride, Cell Number X, Row Stride, Cell Number Y, Channel Stride, Cell Number Z, Dilation Column Stride, Dilation Offset X, Dilation Row Stride, Dilation Offset Y, wherein X is indicative of number of blocks (215) in a horizontal direction of the image, Y is indicative of number of blocks (215) in a vertical direction of the image, Z is indicative of number of blocks (215) per channel in the image. The address of the one or more blocks (215) may be generated using the equations 3 to 8. In an example, the maximum value of the counters may be predetermined based on the dilation rate. For example, consider the baseline architecture of the memory (202) as 4×8, dilation rate of 8, size of the input image (101) as 20×24. The address of the one or more blocks (215) of the input image (101) is determined as shown in FIG. 4E. The address determined for the one or more blocks (215) is indicated by "grey shading" in FIG. 4E. The one or more blocks (215) of the input image (101) with "no shading" will be multiplied with the one or more zeros inserted in the second kernel (401) and do not contribute for the determination of the output image (103). Therefore, the address is not determined for the one or more blocks (215) with "no shading" because the one or more blocks (215) with "no shading" are not required for determining the output image (103).

Referring back to FIG. 3, at operation 304, the computing system (200), fetches the one or more blocks (215) of the input image (101) based on the address and the one or more disintegrated kernels from the memory (202).

In an example, fetching the one or more blocks (215) of the input image (101) includes fetching the plurality of the pixel values (104) of the input image (101) corresponding to each block of the one or more blocks (215) of the input image (101). The address of the one or more blocks (215) of the input image (101) is provided to the memory (202) for fetching the plurality of pixel values (104). The computing system (200) fetches a subset of the one or more blocks (215) of the input image (101) involved in determining the output image (103) based on the convolution.

Figure 4F:
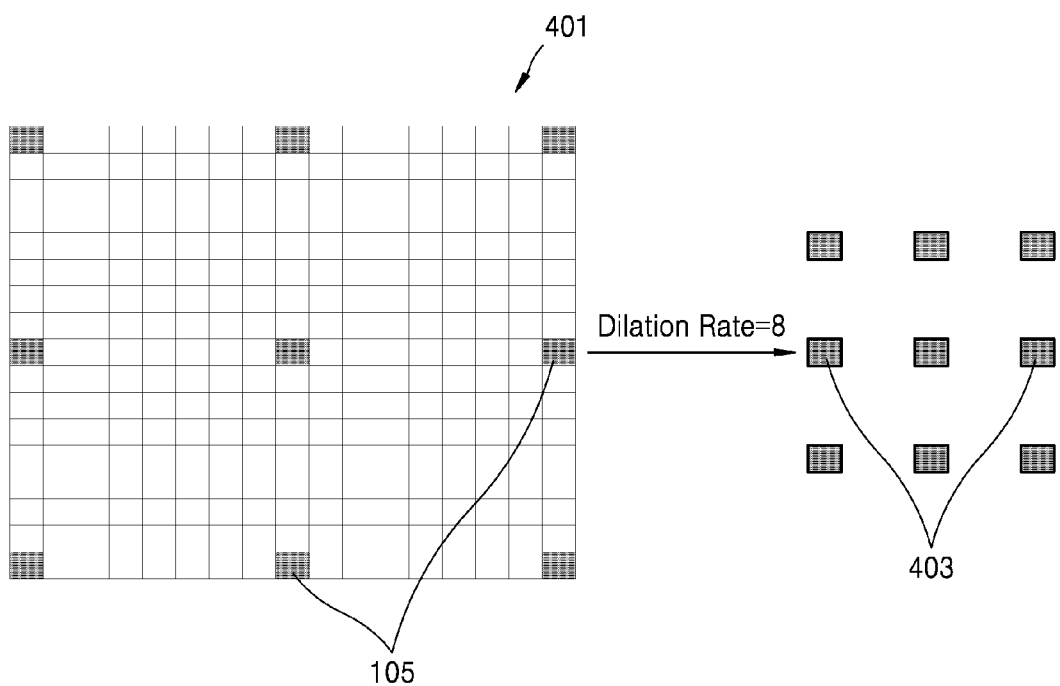
FIG. 4F illustrates an example of determining one or more disintegrated kernels for a dilation rate of 8, in accordance with one or more exemplary embodiments.

In an example, fetching the one or more disintegrated kernels from the memory (202) includes identifying one or more kernel values (105) corresponding to the one or more disintegrated kernels in the second kernel (401), where the second kernel (401) is generated based on the first kernel (102) and the dilation rate and fetching the one or more kernel values (105) corresponding to the one or more disintegrated kernels based on the size of the one or more disintegrated kernels. For example, consider the second kernel (401) having a size of 17×17 generated from the first kernel (102) having a size 3×3 for the dilation rate of 8. The one or more kernel values (105) corresponding to the one or more disintegrated kernels (403) having the size 1×1 is identified as shown in FIG. 4F. In another example, the one or more kernel values (105) corresponding to the one or more disintegrated kernels (403) having a size 1×5 corresponding to the second kernel (401) having a size 25×25 is as shown in FIG. 4G. Further, the address of the one or more disintegrated kernels (403) is provided to the memory (202) for fetching the one or more kernel values (105) associated with each of the one or more disintegrated kernels (403).

Referring back to FIG. 3, in operation 305, the computing system (200), obtains the output image (103) based on convolution of each of the one or more disintegrated kernels (403) and the one or more blocks (215) of the input image (101).

Figure 4H:
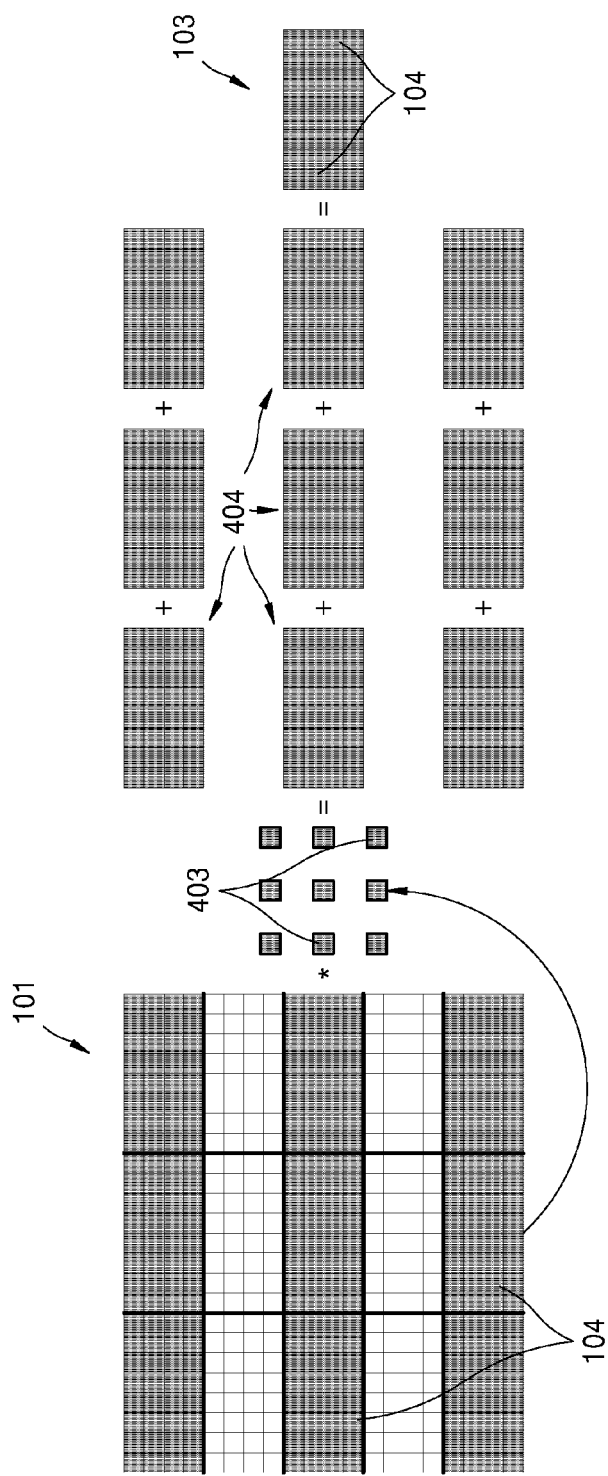
FIG. 4H illustrates an example of determining an output image by convolving the one or more blocks of the input image with one or more disintegrated kernels, in accordance with one or more exemplary embodiments.

In an example, determining the output image (103) includes generating the one or more matrices by multiplying one or more kernel values (105) of each of the one or more disintegrated kernels (403) with a plurality of pixel values (104) corresponding to each block of the one or more blocks (215) of the input image (101) and adding the one or more matrices to determine the output image (103). For example, consider an input image (101) with a size of 20×24 and one or more disintegrated kernels (403) of size 1×1 as shown in FIG. 4H. The one or more blocks (215) of the input image (101) is multiplied with the corresponding one or more disintegrated kernels (403) to generate the one or more matrices as shown in FIG. 4H. The one or more matrices are added to determine the output image (103) as shown in FIG. 4H.

Figure 4I:
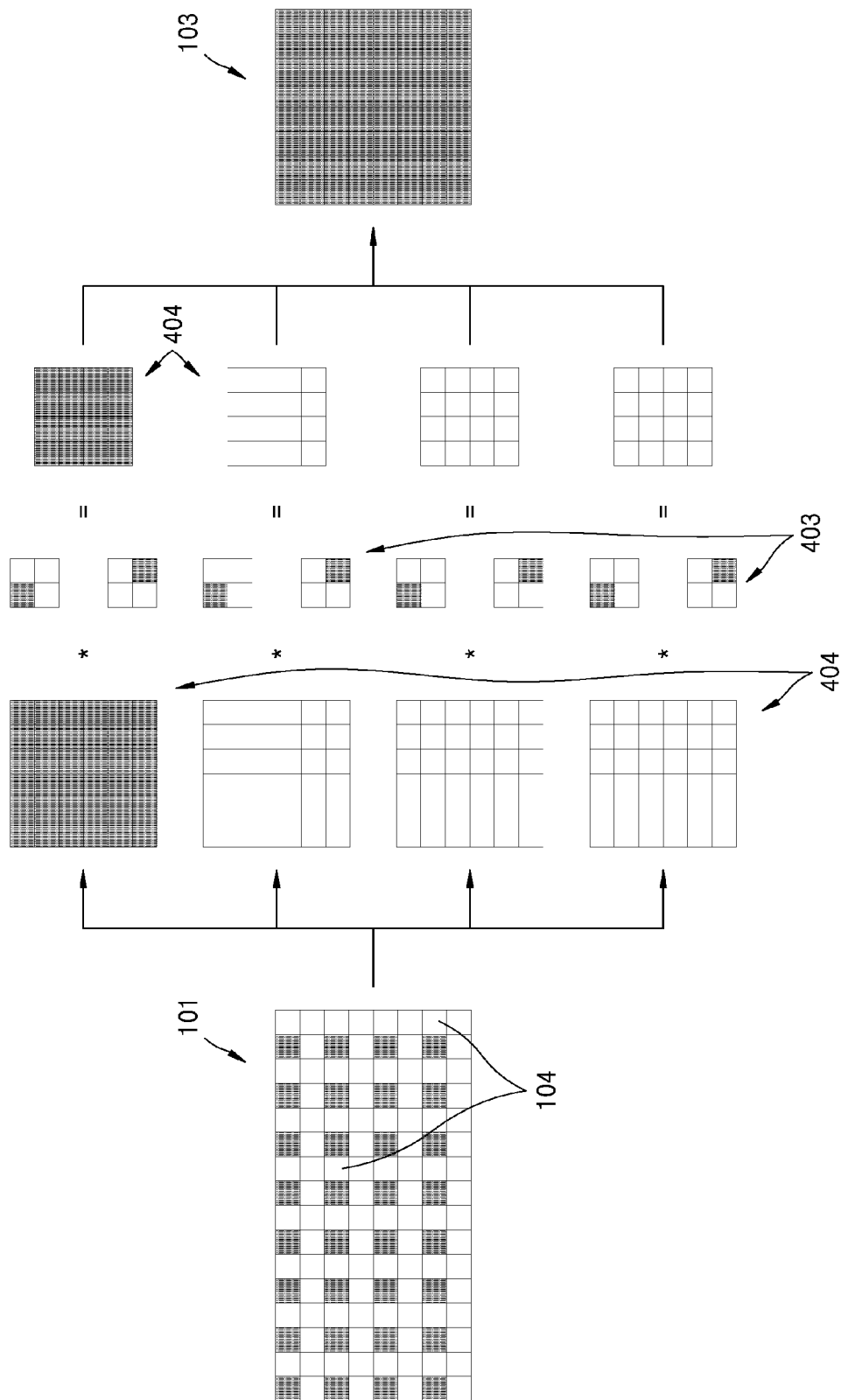
FIG. 4I illustrates an example of determining an output image by convolving the one or more disintegrated kernels with shards of the input image, in accordance with one or more exemplary embodiments.

In an example, when the input image (101) is divided into shards (404) based on the dilation rate and stored in the memory (202) as shown in FIG. 4I. When the input image (101) is divided into shards (404), the dilation rate is reduced based on the number of shards (404) generated. For example, if the input image (101) is divided into 4 shards then the dilation rate of 6 is reduced to 3. For each shard (404) the convolution with each of the one or more disintegrated kernels (403) is performed to generate one or more matrices as shown in FIG. 4I. Further, the one or more matrices (404) are treated as shards and are combined to generate the output image (103) as shown in FIG. 4I.

In an example, the method of performing convolution in a neural network with variable dilation rates divides the second kernel (401) into one or more disintegrated kernels (403), and convolves each of the disintegrated kernels (403) with the one or more blocks (215) of the input image (101). The number of pixel values (104) of the input image (101) to be fetched from the memory (202) is reduced because the one or more blocks (215) convolving with zeros in the second kernel (401) is not fetched from the memory. The number of read cycles required to fetch the one or more blocks (215) from the memory is reduced. Further, fetching the one or more disintegrated kernels (403) may include fetching only some of the kernel values (105) from the second kernel (401), therefore the read cycles and the count of one or more kernel values (105) fetched from the memory (202) is reduced. Further, the count of multiplications and additions performed during convolution is reduced because of the fewer pixel values (104) and fewer kernel values (105) fetched from the memory. Finally, the determination of the output image (103) is faster due to reduced multiplications and additions.

Figure 5:
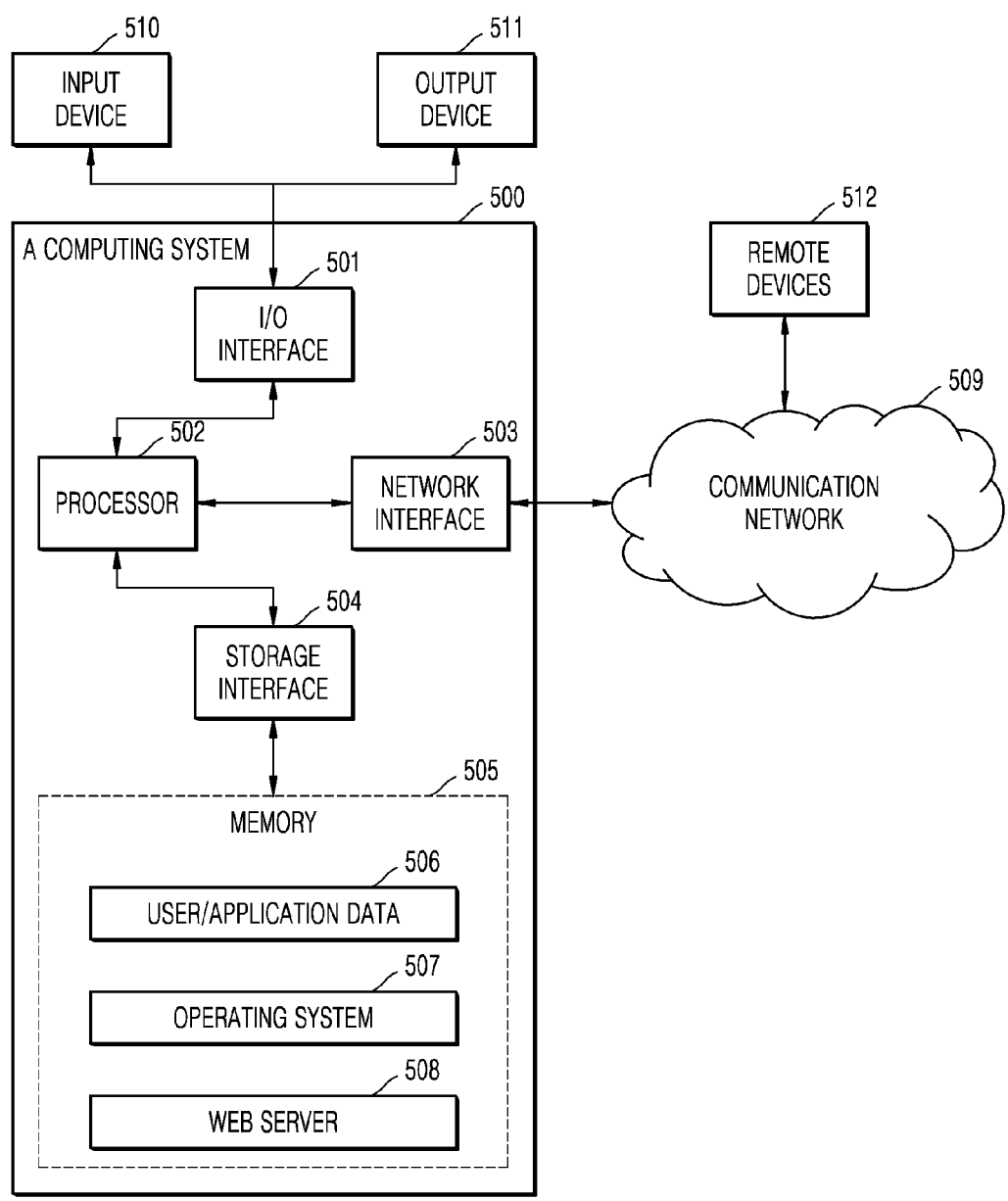
FIG. 5 illustrates an example computer system that performs convolution in a neural network with variable dilation rate, in accordance with one or more exemplary embodiments.

FIG. 5 illustrates a block diagram of an example computer system (500) for implementing the discussed examples.

In an example, the computer system (500) may implement the method for performing convolution in the neural network with variable dilation rate. The computer system (500) may comprise a central processing unit ("CPU" or "processor") (502). The processor (502) may be representative of one or more processors for executing program components for performing convolution in the neural network with variable dilation rate. The processor (502) may include specialized processing units such as integrated system (bus) controllers, memory management control units, floating point units, graphics processing units, digital signal processing units, etc. The processor (502) may be configured to perform one or more, any combination, or all operations described with reference to FIGS. 1A through 4I.

The processor (502) may be disposed in communication with one or more input/output (I/O) devices (not shown) via I/O interface (501). The I/O interface (501) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

By implementing the I/O interface (501), the computer system (500) may communicate with one or more I/O devices. For example, the input device (510) may be, for example, an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some examples, the computer system (500) is connected to the service operator through a communication network (509). The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (509) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (503) and the communication network (509), the computer system (500) may communicate with the one or more service operators.

In some examples, the processor (502) may be disposed in communication with a memory (505) (e.g., RAM, ROM, etc. not shown in FIG. 5 via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, user interface (506), an operating system (507), web server (508) etc. In some embodiments, computer system (500) may store user/application data (506), such as the data, variables, records, etc. as described in this disclosure. Such databases may be implemented as fault-tolerant, relational, scalable, secure databases such as Oracle or Sybase.

The operating system (507) may facilitate resource management and operation of the computer system (500). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (500) may implement a web browser stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, HTML, ADOBE® FLASH®, JAVASCRIPT®, JAVA®, Application Programming Interfaces (APIs), etc. In some embodiments, the computer system (500) may implement a mail server (not shown in figure) stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (500) may implement a mail client stored program component (not shown in figure). The mail client may be a mail viewing application, such as APPLE® MAIL, MICROSOFT® ENTOURAGE®, MICROSOFT® OUTLOOK®, MOZILLA® THUNDERBIRD®, etc.

The input device 510, the output device 511, remote devices 512, the I/O interface 501, the processor 502, the network interface 503, the storage interface 504, the memory 505, the user interface 506, the operating system 507, and the web server 508, with respect to FIGS. 1A-5, and that perform operations described in this application are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1A-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

The input image (101), the dilation rate and the baseline architecture of the memory (202) may be received from the remote devices (512).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

A description of an example with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented convolution method in a neural network, the method comprising:
   receiving, by a computing system, a size of a first kernel and a dilation rate;
   determining, by the computing system, a size of one or more disintegrated kernels based on at least one of the size of the first kernel, a baseline architecture of a memory associated with the computing system, and the dilation rate;
   determining, by the computing system, an address of one or more blocks of an input image corresponding to each of the one or more disintegrated kernels based on the dilation rate and one or more parameters associated with a size of the input image and the memory;
   fetching, by the computing system, the one or more blocks of the input image based on the address, and the one or more disintegrated kernels from the memory; and
   determining, by the computing system, an output image based on convolution of each of the one or more disintegrated kernels and the one or more blocks of the input image.

2. The method as claimed in claim 1, wherein the address of the one or more blocks is determined based on the one or more parameters, wherein the one or more parameters comprise at least one of a Base Address of a first block among the one or more blocks in the memory, a Column Stride, a Cell Number X, a Row Stride, a Cell Number Y, a Channel Stride, a Cell Number Z, a Dilation Column Stride, a Dilation Offset X, a Dilation Row Stride, and a Dilation Offset Y, wherein X is indicative of a number of blocks in a horizontal direction of the image, Y is indicative of a number of blocks in a vertical direction of the image, Z is indicative of a number of blocks per channel in the image.

3. The method as claimed in claim 1, wherein a size of the one or more blocks of the input image stored in the memory is based on the baseline architecture of the memory.

4. The method as claimed in claim 1, wherein the one or more blocks of the input image stored in the memory is based on at least one of the baseline architecture of the memory and the dilation rate.

5. The method as claimed in claim 1, wherein the fetching of the one or more blocks of the input image comprises fetching a plurality of pixel values of the input image corresponding to each block of the one or more blocks of the input image.

6. The method as claimed in claim 1, wherein the fetching of the one or more disintegrated kernels from the memory comprises:
   identifying one or more kernel values corresponding to the one or more disintegrated kernels in a second kernel, wherein the second kernel is generated based on the first kernel and the dilation rate; and
   fetching the one or more kernel values corresponding to the one or more disintegrated kernels based on the size of the one or more disintegrated kernels.

7. The method as claimed in claim 1, wherein the determining of the output image comprises:

generating one or more matrices by multiplying one or more kernel values of each of the one or more disintegrated kernels with a plurality of pixel values corresponding to each block of the one or more blocks of the input image; and adding the one or more matrices to determine the output image.

8. A computing system comprising:

a processor; and a memory communicatively coupled to the processor, wherein the memory stores the processor instructions, which, on execution, causes the processor to:

receive a size of a first kernel and a dilation rate;

determine a size of one or more disintegrated kernels based on at least one of the size of the first kernel, a baseline architecture of the memory associated with the computing system, and the dilation rate;

determine an address of one or more blocks of an input image corresponding to each of the one or more disintegrated kernels based on the dilation rate, and one or more parameters associated with a size of the input image and the memory;

fetch the one or more blocks of the input image based on the address, and the one or more disintegrated kernels from the memory; and determine an output image based on convolution of each of the one or more disintegrated kernels and the one or more blocks of the input image.

9. The computing system as claimed in claim 8, wherein the processor is configured to determine the address of the one or more blocks based on the one or more parameters, wherein the one or more parameters comprise at least one of a Base Address of a first block among the one or more blocks in the memory, a Column Stride, a Cell Number X, a Row Stride, a Cell Number Y, a Channel Stride, Cell Number Z, a Dilation Column Stride, a Dilation Offset X, a Dilation Row Stride, and a Dilation Offset Y, wherein X is indicative of a number of blocks in a horizontal direction of the image, Y is indicative of a number of blocks in a vertical direction of the image, Z is indicative of a number of blocks per channel in the image.

10. The computing system as claimed in claim 8, wherein the processor is configured to determine a size of the one or more blocks of the input image stored in the memory based on the baseline architecture of the memory.

11. The computing system as claimed in claim 8, wherein the processor is configured to store the one or more blocks of the input image in the memory based on at least one of the baseline architecture of the memory and the dilation rate.

12. The computing system as claimed in claim 8, wherein the fetching of the one or more blocks of the input image by the processor comprises fetching a plurality of pixel values of the input image corresponding to each block of the one or more blocks of the input image.

13. The computing system as claimed in claim 8, wherein the fetching of the one or more disintegrated kernels from the memory by the processor comprises:

identifying one or more kernel values corresponding to the one or more disintegrated kernels in a second kernel, wherein the second kernel is generated based on the first kernel and the dilation rate; and fetching the one or more kernel values corresponding to the one or more disintegrated kernels based on the size of the one or more disintegrated kernels.

14. The computing system as claimed in claim 8, wherein the determining of the output image by the processor comprises:

generating one or more matrices by multiplying one or more kernel values of each of the one or more disintegrated kernels with a plurality of pixel values corresponding to each block of the one or more blocks of the input image; and adding the one or more matrices to determine the output image.

* * * * *